US011045887B2

(12) United States Patent
Tennant et al.

(10) Patent No.: US 11,045,887 B2
(45) Date of Patent: Jun. 29, 2021

(54) MITER SAW

(71) Applicant: AC (Macao Commercial Offshore) Limited, Macau (MO)

(72) Inventors: C. Scott Tennant, Clemson, SC (US); Michael Hart, Anderson, SC (US); Walter Knight, Anderson, SC (US); Alek Ipatenco, Belton, SC (US)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 347 days.

(21) Appl. No.: 14/930,006

(22) Filed: Nov. 2, 2015

(65) Prior Publication Data

US 2017/0120353 A1 May 4, 2017

(51) Int. Cl.
*B23D 45/04* (2006.01)
*B23D 47/02* (2006.01)

(52) U.S. Cl.
CPC ......... *B23D 47/025* (2013.01); *B23D 45/048* (2013.01)

(58) Field of Classification Search
CPC ...... B23D 47/025; B23D 45/048; B27B 5/29; Y10T 83/7684; Y10T 83/855; Y10T 83/8773
See application file for complete search history.

(56) References Cited

U.S. PATENT DOCUMENTS

| | | | |
|---|---|---|---|
| 2,227,234 A | 12/1940 | Segal | |
| 3,386,482 A * | 6/1968 | Nadeau | B27B 5/182 83/477.1 |
| 3,487,863 A | 1/1970 | Buckley | |
| 4,452,117 A | 6/1984 | Brickner et al. | |
| 5,379,816 A | 1/1995 | Charlton | |
| 5,564,323 A * | 10/1996 | Sasaki | B23D 47/025 83/471.3 |
| 6,758,123 B2 | 7/2004 | Svetlik et al. | |

(Continued)

FOREIGN PATENT DOCUMENTS

EP 2929993 10/2015

OTHER PUBLICATIONS

Yale, yale environmental health & safety shop procedure, Jul. 2, 2014, https://ehs.yale.edu/sites/default/files/files/wood-miter-saws.pdf (Year: 2014).*

*Primary Examiner* — Evan H MacFarlane
*Assistant Examiner* — Liang Dong
(74) *Attorney, Agent, or Firm* — Michael Best & Friedrich LLP (57) ABSTRACT

A miter saw includes a base, a table pivotally coupled to the base about a miter axis, and a saw unit coupled to the table for movement about the miter axis. A workpiece support is pivotable relative to the base between a first position, in which the table is permitted to pivot about the miter axis within a first range of miter angles, and a second position, in which the table is permitted to pivot about the miter axis within a second range of miter angles different than the first range. The miter saw further includes a locking mechanism for maintaining the workpiece support in at least one of the first position or the second position, wherein the locking mechanism includes an actuator supported by and moveable with the workpiece support between the first position and the second position.

17 Claims, 5 Drawing Sheets

(56) References Cited

U.S. PATENT DOCUMENTS

| | | | | |
|---|---|---|---|---|
| 8,002,253 B2* | 8/2011 | Thomas | ............... | B23D 45/048 |
| | | | | 269/63 |
| 2003/0228197 A1 | 12/2003 | Salvaryan | | |
| 2005/0229761 A1 | 10/2005 | Bettacchini | | |
| 2008/0041211 A1 | 2/2008 | Gibbons et al. | | |
| 2008/0047406 A1 | 2/2008 | Hollis et al. | | |
| 2008/0137147 A1 | 7/2008 | Kovarik et al. | | |
| 2008/0302224 A1 | 12/2008 | Chen et al. | | |
| 2009/0301277 A1* | 12/2009 | Ipatenco | ............... | B23D 45/048 |
| | | | | 83/471 |
| 2011/0048203 A1* | 3/2011 | Cheng | ................. | B23D 47/025 |
| | | | | 83/471.3 |
| 2016/0311040 A1* | 10/2016 | Koegel | ................ | B23D 47/025 |

* cited by examiner

MITER SAW

FIELD OF THE INVENTION

The invention relates to power tools, and more particularly to saws, such as miter saws, chop saws, etc.

BACKGROUND OF THE INVENTION

Miter saws are generally used for making miter cuts on workpieces. In order to make such a miter cut on a workpiece, the saw blade must be angularly adjusted to a desired miter angle relative to the base and the workpiece. Typically, miter saws enable a user to angularly adjust the saw blade to preset miter angles, such as 0°, 15°, 22.5°, 30°, and 45°. Once the saw blade has been adjusted to the desired miter angle, it is advantageous to lock the saw blade in position in order to make consistent, repeatable cuts.

SUMMARY OF THE INVENTION

The invention provides, in one aspect, a miter saw including a base, a table pivotally coupled to the base about a miter axis, and a saw unit coupled to the table for movement about the miter axis. The miter saw also includes a workpiece support pivotable relative to the base between a first position, in which the table is permitted to pivot about the miter axis within a first range of miter angles, and a second position, in which the table is permitted to pivot about the miter axis within a second range of miter angles different than the first range. The miter saw further includes a locking mechanism for maintaining the workpiece support in at least one of the first position or the second position. The locking mechanism includes an actuator supported by and moveable with the workpiece support between the first position and the second position.

The invention provides, in another aspect, a miter saw including a base having first and second sidewalls at opposite ends of the base, respectively, defining a width of the base. The miter saw also includes a table pivotally coupled to the base about a miter axis, a saw unit coupled to the table assembly for movement about the miter axis, and a workpiece support pivotable relative to the base between a first position, in which a sidewall of the workpiece support is substantially parallel with the first sidewall of the base, and a second position, in which the sidewall of the workpiece support protrudes laterally outward from the first sidewall of the base.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
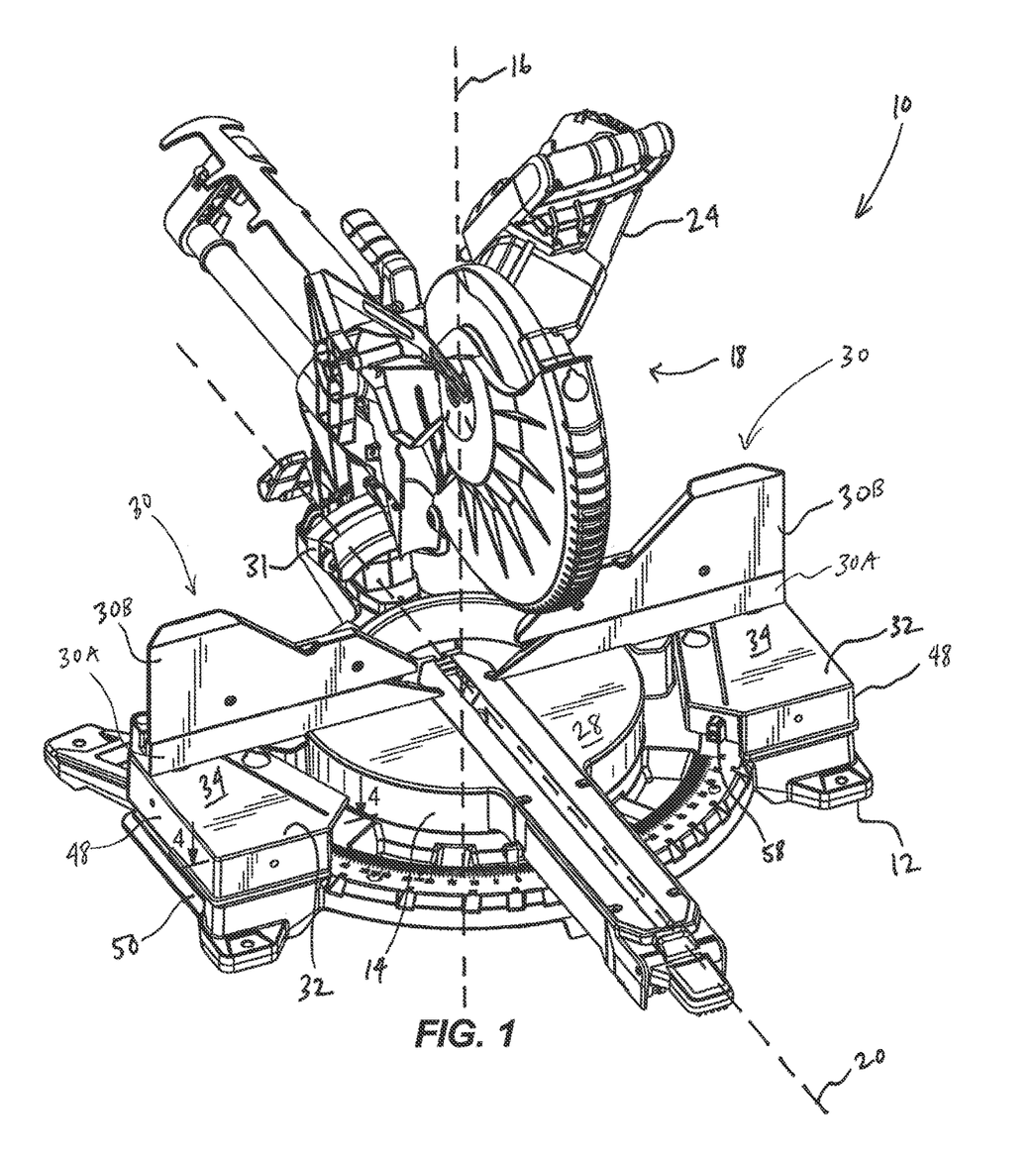
FIG. 1 is a front perspective view of a miter saw in accordance with an embodiment of the invention.
Figure 2:
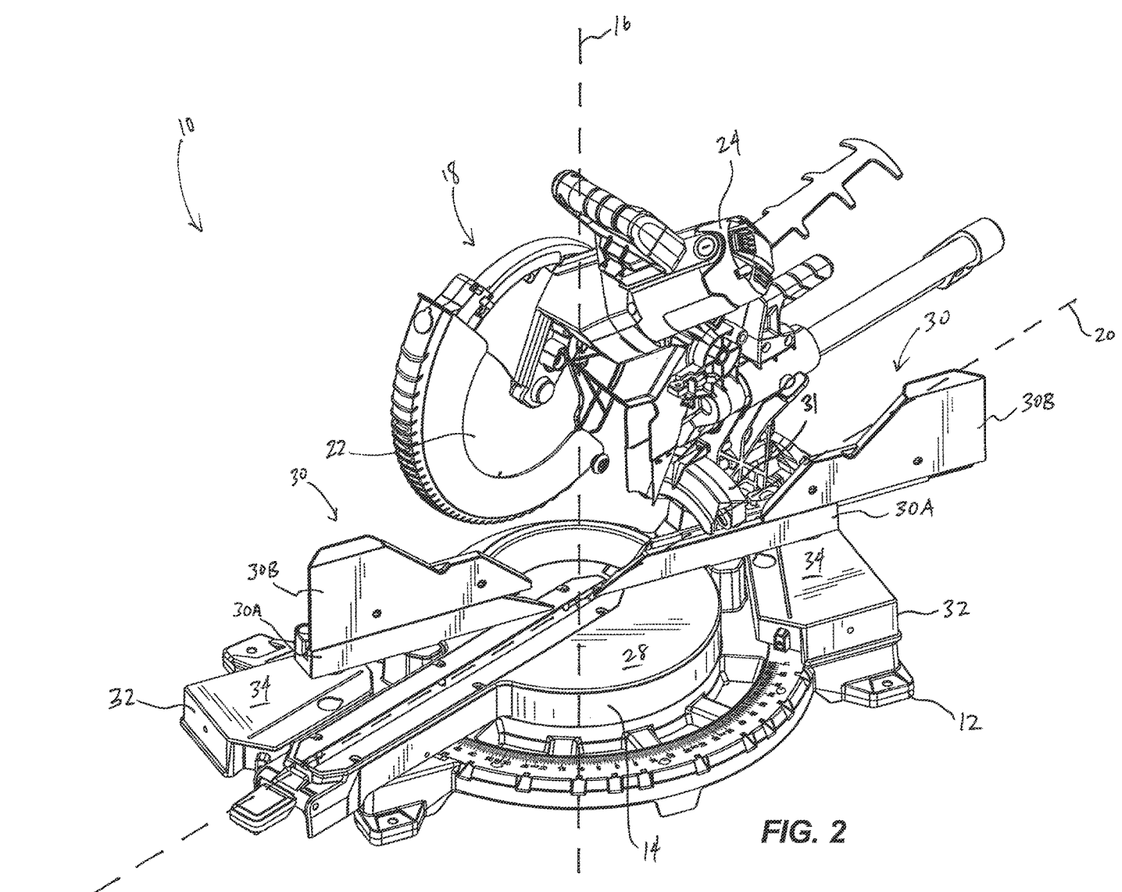
FIG. 2 is another front perspective view of the miter saw of FIG. 1, illustrating a workpiece support in an extended position.

FIGS. 1 and 2 illustrate a miter saw 10 including a base 12, a turntable 14 pivotably coupled to the base 12 about a miter axis 16, and a saw unit 18 pivotably coupled to the turntable 14 about a bevel axis 20. The saw unit 18 includes a saw blade 22, a motor 24 for rotating the saw blade 22, and an actuator (e.g., a trigger, not shown) for activating and deactivating the motor 24. The turntable 14 defines a workpiece support surface 28 upon which a workpiece may be placed in preparation for a cutting operation. The miter saw 10 also includes spaced fence assemblies 30 positioned on opposite sides of the saw blade 22 that are perpendicular to the work piece support surface 28 of the turntable 14 against which the workpiece may also be abutted during a cutting operation. Each of the fence assemblies 30 includes a stationary, lower fence portion 30A attached to the base 12 and an upper fence portion 30B that is slidably coupled to the lower fence portion 30A (see also FIG. 2). The miter saw 10 also includes a bevel angle scale 31 coupled for pivoting movement with the turntable about the miter axis 16. The scale 31 is provided to indicate the bevel angle at which the saw unit 18 is pivoted about the bevel axis 20 during use of the miter saw 10.

With continued reference to FIGS. 1 and 2, the miter saw 10 further includes a pair of workpiece supports 32 coupled to the base 12 and positioned on opposite sides of the turntable 14. The workpiece supports 32 define additional workpiece support surfaces 34 that are coplanar with the workpiece support surface 28 of the turntable 14. Therefore, for a workpiece having a length greater than the width of the turntable 14, opposite ends of the workpiece may be supported upon the workpiece supports 32. In the illustrated embodiment of the miter saw 10, each of the workpiece supports 32 is pivotable relative to the base 12 about an axis 36 (FIG. 3) that is parallel with the miter axis 16, from a retracted position (shown in phantom in FIG. 5) to an extended position (shown in solid in FIG. 5), to extend the effective width of the combined workpiece support surfaces 28, 34 of the turntable 14 and workpiece supports 32, respectively, when needing to cut workpieces longer than the width W of the base 12 (FIG. 5).

Each of the workpiece supports 32 includes a cylindrical shaft or pin 38 receivable within a corresponding cylindrical aperture 40 (FIG. 4) in the base 12, such that the workpiece supports 32 are pivotably coupled to the base 12 independently of each other. Alternatively, the cylindrical pin 38 may be provided on the base 12 and the cylindrical aperture 40 defined in the workpiece support 32. As a further alternative, the workpiece supports 32 may be movable and/or adjustable relative to the base 12 in any of a number of different manners besides pivoting to accommodate different length workpieces. The workpiece supports 32 are identical; therefore, only one of which is described in detail below.

Figure 3:
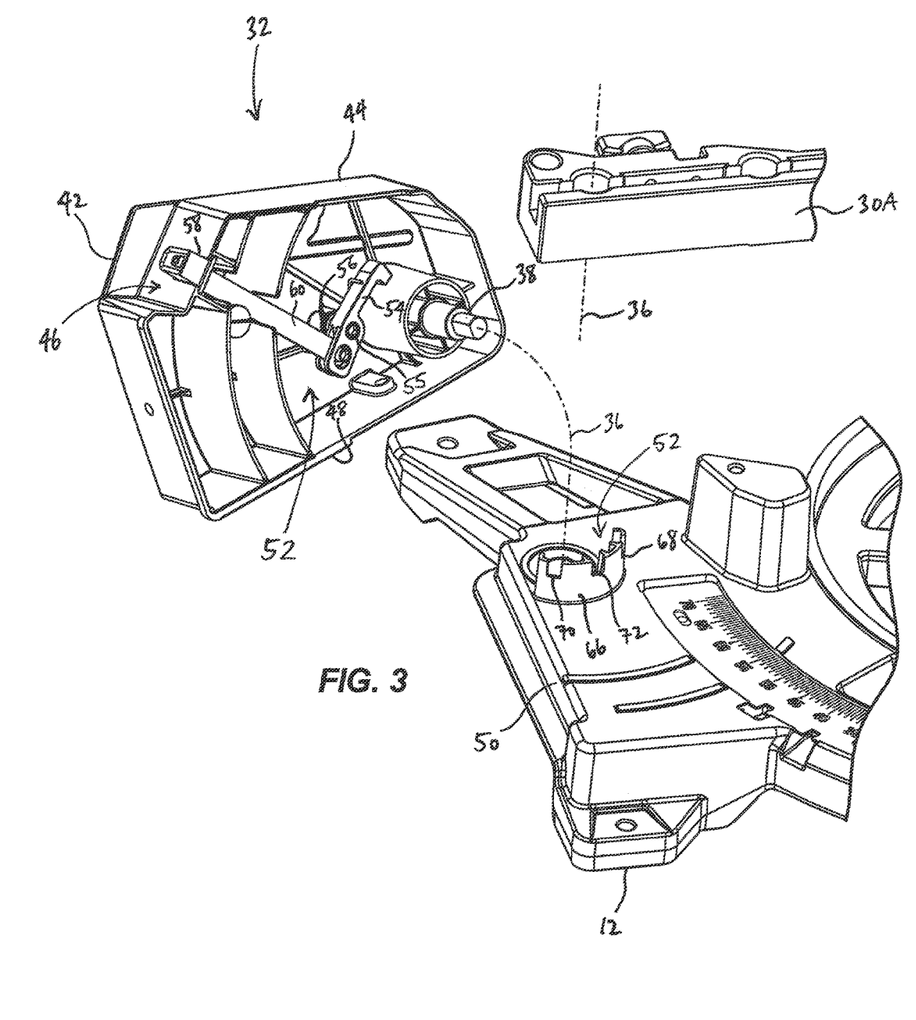
FIG. 3 is an enlarged view of the miter saw of FIG. 1, illustrating the workpiece support exploded from a base of the miter saw.
Figure 5:
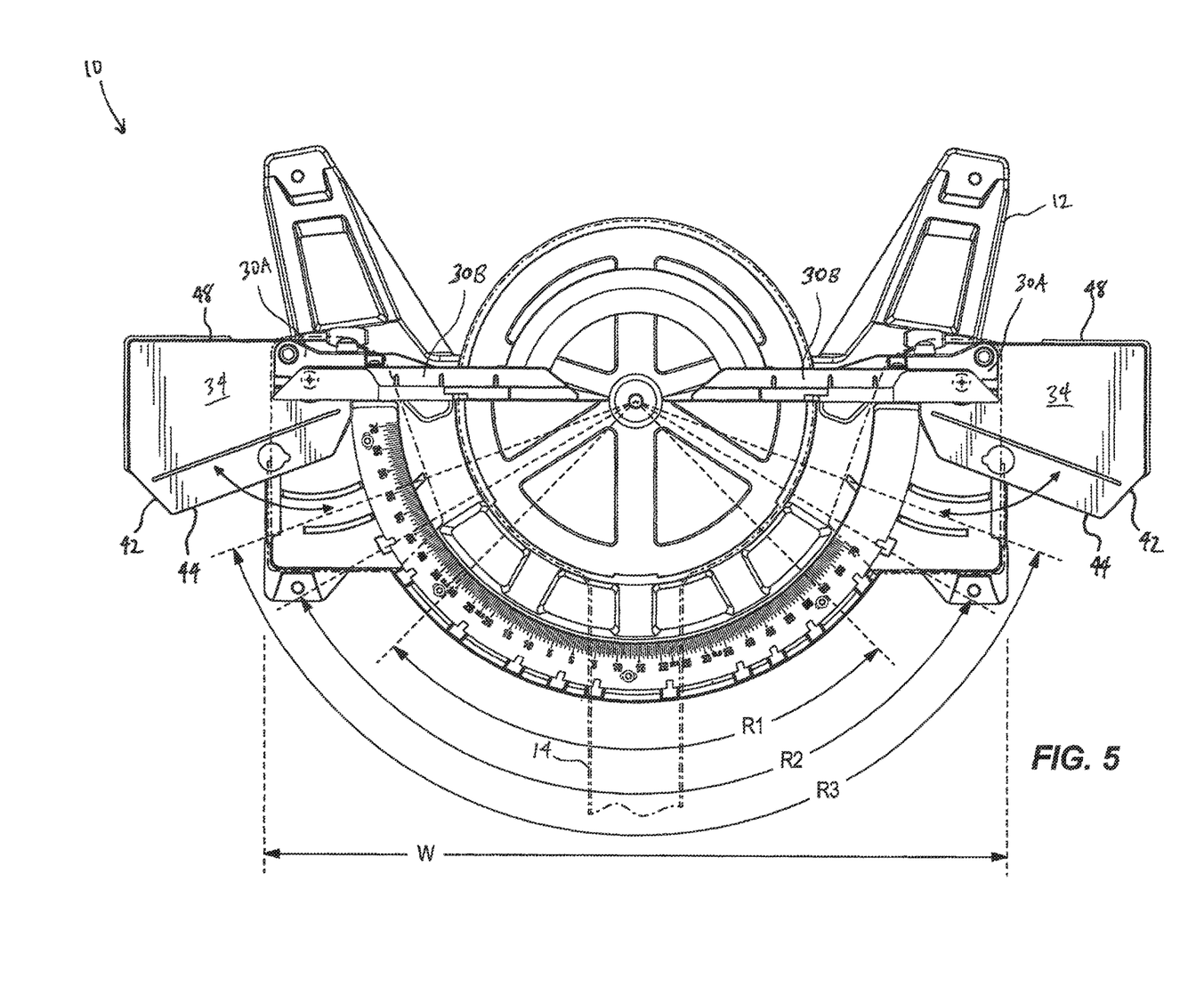
FIG. 5 is a top view of the miter saw of FIG. 1, illustrating two workpiece supports in the extended position.

With reference to FIGS. 2 and 5, the workpiece support 32 includes a stop 42 which, when in the retracted position of the workpiece support 32, is engageable with the turntable 12 to limit the extent to which the turntable 14 is capable of pivoting about the miter axis 16 to a first range R1 of miter angles (FIG. 5). The workpiece support 32 also includes another stop 44 which, when in the extended position of the workpiece support 32, is engageable with the turntable 14 to limit the extent to which the turntable 14 is capable of pivoting about the miter axis 16 to a different range R3 of miter angles. In the illustrated embodiment of the miter saw 10, the stops 42, 44 are defined, respectively, by adjacent edges of the workpiece support 32 bounding the workpiece support surface 34. Alternatively, the workpiece support 32 may include elastomeric bumpers proximate the edges with which the turntable 14 is engageable. With reference to FIG. 3, the workpiece support 32 includes a cavity 46 disposed adjacent the stops 42, 44, the purpose of which is described below.

Figure 4:
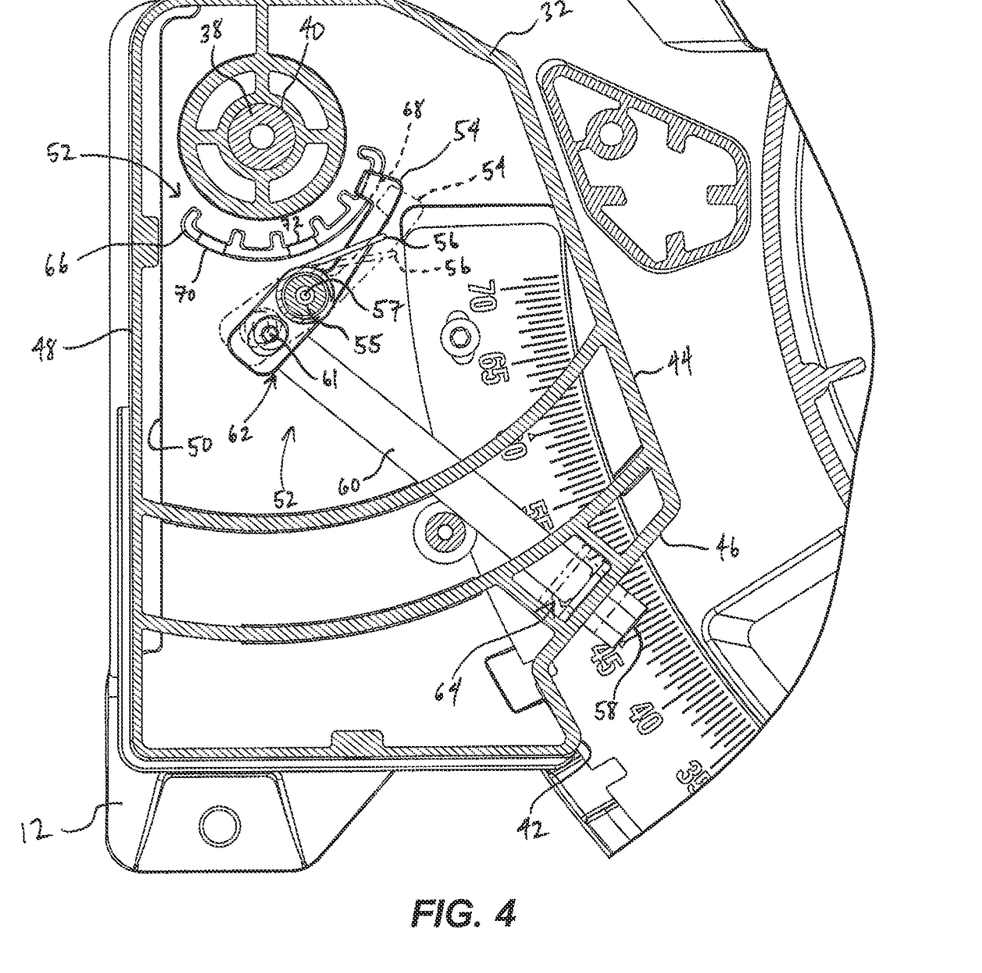
FIG. 4 is a top cutaway view of a portion of the miter saw of FIG. 1, illustrating a locking mechanism securing the workpiece support relative to the base in a retracted position.

With reference to FIGS. 1 and 4, the workpiece support 32 further includes a sidewall 48 opposite the stops 42, 44. When the workpiece support 32 is in the retracted position as shown in FIG. 4, the sidewall 48 is substantially parallel with a sidewall 50 of the base 12. However, when the workpiece support 32 is in the extended position as shown in solid in FIG. 5, the sidewall 48 of the workpiece support 32 protrudes outward in the lateral direction from the sidewall 50 of the base 12, thereby extending the workpiece support surface 34 of the workpiece support 32 laterally beyond the base 12. Accordingly, when the workpiece supports 32 are extended, the effective width of the combined workpiece support surfaces 28, 34 of the turntable 14 and workpiece supports 34, respectively, is greater than the width W of the base 12.

With reference to FIGS. 3 and 4, the miter saw 10 further includes a locking mechanism 52 for each of the workpiece supports 32 to secure the workpiece supports 32 in the retracted position and the extended position. The locking mechanism 52 includes a latch 54 coupled to the underside of the workpiece support 32 by a pivot 55 (e.g., the shank of a threaded fastener) for movement about a pivot axis 57 between two pivot positions, and a biasing member for biasing the latch 54 toward a first of the pivot positions. In the illustrated embodiment of the miter saw 10, the biasing member is a torsion spring 56 disposed coaxially with the pivot axis 57. Alternatively, the biasing member may be configured as a tension or compression spring, with one end attached or seated against the underside of the workpiece support 32 and the other end attached or seated against a portion of the latch 54 offset from the pivot axis 57.

The locking mechanism 52 also includes an actuator (e.g., a button 58) located within the cavity 46 of the workpiece support 32. The button 58 does not protrude from the cavity 46 or beyond the stops 42, 44; therefore, the turntable 14 is ensured to abut the stops 42, 44 rather than the button 58. Although the button 58 is disposed within the cavity 46, the button 58 is located on the exterior of the workpiece support 32 such that the button 58 is easily accessible by an operator. With reference to FIG. 4, the locking mechanism 52 further includes a link 60 interconnecting the latch 54 and the button 58. A first end 62 of the link 60 is pivotably coupled to the latch 54 by another pivot 61, while a second end 64 of the link 14 is affixed within a corresponding aperture in the button 58 (e.g., by an interference fit) to effectively unitize the button 58 and the link 60. The latch 54, the torsion spring 56, the link 60, and the button 58 are each disposed on the underside of the workpiece support 32. As such, these components are concealed from view by the workpiece support surface 34, and are movable with the workpiece support 32 as it is pivoted between the refracted position and the extended position.

With reference to FIGS. 3 and 4, the locking mechanism 52 further includes an arcuate wall 66 formed on the base 12 and having three recesses 68, 70, 72 defined therein in which the latch 54 is selectively receivable for locking the workpiece support 32 in the retracted position and the extended position. As shown in FIG. 4, linear displacement of the button 58 is converted to a pivoting movement of the latch 54 between two pivot positions—a locked pivot position (shown in solid) in which the latch 54 is received in one of the recesses 68, 70, 72 to secure the workpiece support 32 in the retracted position or the extended position, and an unlocked pivot position (shown in phantom) in which the latch 54 is removed from the recesses 68, 70, 72 and held away from the wall 66 to permit adjustment of the workpiece support 32 between the refracted position and the extended position. As described in more detail below, the latch 54 is selectively engaged with a first of the recesses 68 to secure the workpiece support 32 in the retracted position (shown in phantom in FIG. 5), a second of the recesses 70 to secure the workpiece support 32 in the extended position (shown in solid in FIG. 5), and a third of the recesses 72 located between the first and second recesses 68, 70 to secure the workpiece support 32 in an intermediate extended position (not shown). In an alternative embodiment of the miter saw 10, the arcuate wall 66 could be formed on the workpiece support 32 and the latch 52 could be pivotably or otherwise movably coupled to the base 12. In such an embodiment, the second end 62 of the link 60 would not be attached to the latch 54, but rather could be slidably engageable with different portions of the latch 54 depending upon the position of the workpiece support 32.

In operation of the miter saw 10, the miter angle of the saw unit 18 may be adjusted as desired prior to cutting a workpiece by pivoting the turntable 14 about the miter axis 16. In some cases, to rotate the turntable 14 to a desired miter angle, one or both of the workpiece supports 32 may be pivoted from the retracted position (shown in phantom in FIG. 5) to either the intermediate extended position or the extended position (shown in solid in FIG. 5). To adjust either of the workpiece supports 32, the operator of the miter saw 10 first depresses the button 58, causing the link 60 to move in unison and pivot the latch 54 against the bias of the torsion spring 56 toward the unlocked pivot position, shown in phantom in FIG. 4. Accordingly, the latch 54 is removed from one of the recesses (e.g., recess 68) in the wall 66, allowing the operator to pivot the workpiece support 32 to a different detent position associated with another recess (e.g., recesses 70, 72) in the wall 66 in order to achieve the desired miter angle. As the workpiece support 32 pivots between any two adjacent detent positions with the button 58 released, the latch 54 slides along the arcuate wall 66. As the workpiece support 32 nears the next detent position, the latch 54 encounters the recess 70, 72 corresponding to the next detent position, causing the torsion spring 56 to pivot the latch 54 into the locked pivot position to secure the workpiece support 32 in the detent position. If it is desired to adjust the workpiece support 32 from the retracted position to the extended position, thereby bypassing the intermediate extended position, the operator of the miter saw 10 may keep the button 58 depressed while pivoting the workpiece support 32 from the retracted position to the extended position. As a result, the latch 54 is maintained in the unlocked position, in which it is incapable of being received in the recess 72 corresponding with the intermediate extended position. If the size and/or shape of the workpiece requires the workpiece supports 32 to be adjusted to a position other than one of the detent positions, the operator may adjust the workpiece supports 32 to such a position without using the latch 54 to secure the workpiece supports 32 to the base 12.

With reference to FIG. 5, when each of the workpiece supports 32 is in the retracted position, the turntable 14 is permitted to pivot about the miter axis 16 within the first range R1 of miter angles. In the illustrated embodiment of the miter saw 10, the first range R1 of miter angles spans an arc length of about 90 degrees between the stops 42 of the respective workpiece supports 32, permitting the turntable 14 to rotate ±45 degrees about the miter axis 16 (i.e., 45 degrees to the left or right from a reference angle of 0 degrees, in which the saw blade 10 is oriented transverse to the workpiece). Therefore, if a miter angle within this span is desired, the workpiece supports 32 may remain in the retracted position because the workpiece supports 32 will not impede rotation of the turntable 14 to the desired miter angle. However, if a miter angle outside this span is desired, one or more of the workpiece supports 32 can be adjusted to expand the range of selectable miter angles beyond the first range R1.

For example, to expand the range of selectable miter angles to a second range R2 of miter angles spanning an arc length of about 120 degrees, both workpiece supports 32 are adjusted from the retracted position to the intermediate expanded position as described above. In this case, the turntable 14 may be rotated ±60 degrees about the miter axis 16 (i.e., 60 degrees to the left or right from a reference angle of 0 degrees, in which the saw blade 22 is oriented transverse to the workpiece). Further, when it is desired to further expand the range of selectable miter angles to a third range R3 of miter angles spanning an arc length of about 140 degrees between the stops 44 of the respective workpiece supports, both workpiece supports 32 are adjusted from the intermediate expanded position to the expanded position as described above. In this case, the turntable 14 may be rotated ±70 degrees about the miter axis 16 (i.e., 70 degrees to the left or right from a reference angle of 0 degrees, in which the saw blade 22 is oriented transverse to the workpiece). However, in the illustrated embodiment of the miter saw 10, the upper fence portion 30B must be repositioned relative to (or removed from) the lower fence portion 30A to avoid interference with the scale 31 as the turntable 14 is pivoted between the extreme miter angle positions permitted when the workpiece supports 32 are in the expanded position. As shown in FIG. 2, when the turntable 14 is pivoted to a −70 degree miter angle position, the scale 31 overhangs the right-side lower fence portion 30A. Likewise, when the turntable is pivoted to a +70 degree miter angle position (not shown), the scale overhangs the left-side lower fence portion 30A.

Because the button 58 is accessible beneath the workpiece support surface 34 of the workpiece support 32, an operator of the miter saw 10 is permitted to unlock the latch 54, pivot the workpiece support 32 to a different detent position, and re-lock the latch 54 (thereby again securing the workpiece support 32 to the base 12) using only a single hand.

Various features of the invention are set forth in the following claims.

What is claimed is:

1. A miter saw comprising:
   a base;
   a table pivotally coupled to the base about a miter axis;
   a saw unit coupled to the table for movement about the miter axis;
   a workpiece support pivotable relative to the base between a first position, in which the table is permitted to pivot about the miter axis within a first range of miter angles, and a second position, in which the table is permitted to pivot about the miter axis within a second range of miter angles different than the first range; and
   a locking mechanism for maintaining the workpiece support in at least one of the first position or the second position, wherein the locking mechanism includes an actuator supported by and moveable in unison with the workpiece support between the first position and the second position, wherein the actuator is directly engageable on the workpiece support to an operator of the miter saw to permit the actuator to be manipulated and the workpiece support to be pivoted by the operator between the first and second positions with only a single hand;
   wherein the workpiece support includes a first stop against which the table is engageable in the first position to limit an extent to which the table is pivotable about the miter axis, a second stop against which the table is engageable in the second position to limit the extent to which the table is pivotable about the miter axis, and a cavity defined adjacent the first stop and the second stop, wherein the actuator is located within the cavity.

2. The miter saw of claim 1, wherein the workpiece support is pivotable about an axis parallel with the miter axis.

3. The miter saw of claim 1, wherein the second range of miter angles is larger than the first range of miter angles.

4. The miter saw of claim 1, wherein the workpiece support is pivotable to a third position, in which the table is permitted to pivot about the miter axis within a third range of miter angles that is different than the first range of miter angles and the second range of miter angles.

5. The miter saw of claim 4, wherein the third range of miter angles is larger than the first range of miter angles and the second range of miter angles.

6. The miter saw of claim 1, wherein the actuator does not protrude from the cavity or beyond the first stop and the second stop.

7. The miter saw of claim 1, wherein the locking mechanism further includes
   first and second recesses defined in one of the base or the workpiece support, and
   a latch coupled to the other of the base or the workpiece support, wherein the latch is selectively receivable in the first and second recesses for locking the workpiece support in the first and second positions, respectively.

8. The miter saw of claim 7, wherein the first and second recesses are defined in the base, and wherein the locking mechanism is coupled for movement with the workpiece support between the first and second positions.

9. The miter saw of claim 7, wherein the latch is pivotable between a first pivot position in which the latch is receivable in one of the first and second recesses, and a second pivot position in which the latch is removed from the first and second recesses.

10. The miter saw of claim 9, further comprising a biasing member for urging the latch toward the first pivot position.

11. The miter saw of claim 10, wherein the first and second recesses are defined in an arcuate wall, and wherein the latch is slidable along the wall in response to the workpiece support being pivoted between the first position and the second position.

12. The miter saw of claim 11, wherein the latch is movable into the first pivot position by the biasing member in response to encountering the first recess or the second recess in the wall as the workpiece support is pivoted between the first position and the second position.

13. The miter saw of claim 9, wherein the locking mechanism further includes a link extending between the latch and the actuator.

14. The miter saw of claim 13, wherein the link includes a first end pivotably coupled to the latch and a second end adjacent the actuator, and wherein the link converts linear movement of the actuator to pivoting movement of the latch.

15. The miter saw of claim 1, wherein the workpiece support is positioned adjacent one side of the base.

16. The miter saw of claim 15, wherein the workpiece support is a first workpiece support, and wherein the miter saw further comprises a second workpiece support positioned adjacent an opposite side of the base.

17. The miter saw of claim 16, wherein the first workpiece support and the second workpiece support are each pivotable between the first position and the second position independently of each other.

* * * * *